N. B. GALLOWAY.
HOG TRAP.
APPLICATION FILED NOV. 28, 1913.

1,117,996.

Patented Nov. 24, 1914.

Witnesses
Q. A. Putnam
L. E. Berkley

Inventor,
Norval B. Galloway,
by Franks Annleman,
Attorney

THE NORRIS PETERS CO., PHOTO-LITHO., WASHINGTON, D. C.

UNITED STATES PATENT OFFICE.

NORVAL B. GALLOWAY, OF STREATOR, ILLINOIS.

HOG-TRAP.

1,117,996.  Specification of Letters Patent.  Patented Nov. 24, 1914.

Application filed November 28, 1913. Serial No. 803,545.

*To all whom it may concern:*

Be it known that I, NORVAL B. GALLOWAY, a citizen of the United States of America, and resident of Streator, in the county of La Salle and State of Illinois, have invented certain new and useful Improvements in Hog-Traps, of which the following is a specification.

This invention relates to animal industry and particularly to hog traps.

An object of this invention is to provide novel means for corralling a hog and causing the said hog to travel to a clamping device through which his head may project and in which it is held against dislodgment while the hog is being treated.

A further object of this invention is to provide a combined trap and loading chute or way in which the casing or frame of the trap is provided with a removable inclined floor from which animals may travel from a pen to a car or vice versa, it being understood that when the device is used in the connection just mentioned, the clamping mechanism may be removed and therefore provision is made for detachably suspending the clamping mechanism in place.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
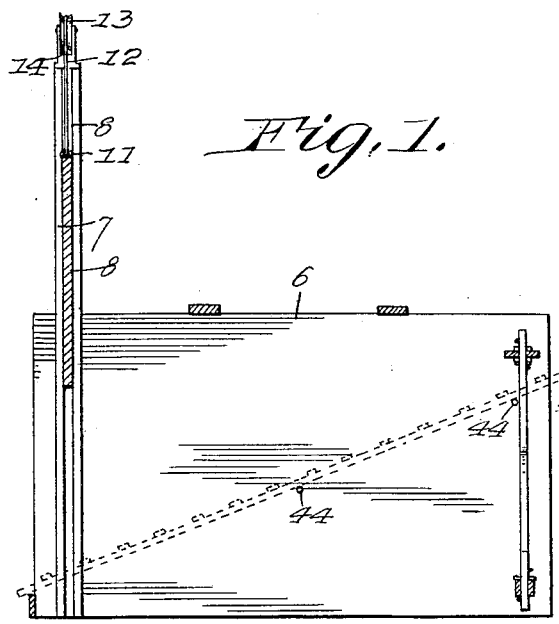
Figure 2:
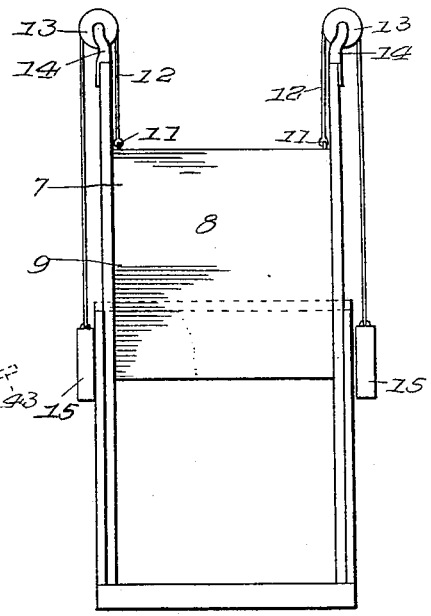
Figure 3:
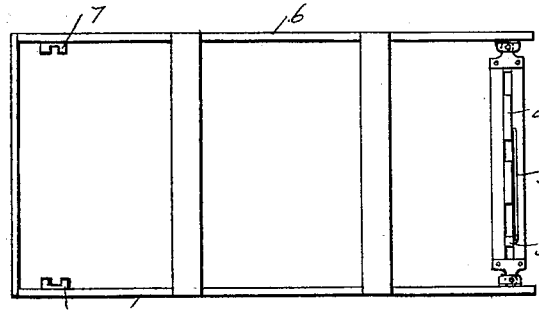
Figure 4:
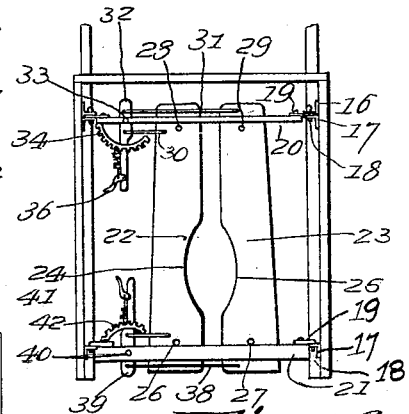
Figure 5:
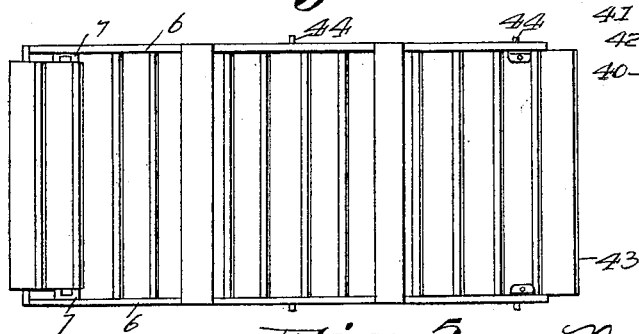

Figure 1 illustrates a longitudinal vertical sectional view of a trap embodying the invention; Fig. 2 illustrates a view in elevation of the end thereof; Fig. 3 illustrates a plan view of the trap with the gate removed; Fig. 4 illustrates a view in elevation of the end opposite that shown in Fig. 2; and Fig. 5 illustrates a plan view of a trap when used as a loading and unloading device.

The trap comprises an approximately rectangular pen or receptacle 6 having at one end guide posts 7, each provided with a groove 8 forming a way in which the door 9 travels vertically. The upper edge of the door has eyes 11 to which flexible connections 12 are attached, the said flexible connections 12 operating over pulleys 13 carried by the brackets 14, which brackets are mounted on the posts 7. Weights 15 are suspended from the outer ends of the flexible connections 12 and counter balance the weight of the door so that the door is held in its elevated position as shown in Fig. 2, thus unguarding the opening at one end of the trap. The unguarded end of the trap as thus shown may be situated at the door of a hog pen and a hog may be driven into the said opening after which the door may be forced downwardly to close the opening.

The clamping device is suspended on brackets 16, each comprising a plate having a lug 17 apertured to receive the lug 18 of a plate 19, which plate is attached to a grooved bar 20. It is to be understood that the elements just described and referred to by the numerals 16 to 20 are duplicated on each end of the bar 20 and that like elements are provided at each end of a grooved bar 21 stationed near the bottom of the front end of the trap.

The clamping member comprises two jaws 22 and 23 having their opposed faces provided with recesses 24 and 25 respectively forming seats, the edges of which are forced into engagement with the neck of the hog to hold him against withdrawing his head. The jaws are supported in the grooved bars by means of pins 26 and 27 respectively, which ride on the upper surface of the grooved bar 21 and the said jaws are prevented from upward displacement by the pins 28 and 29 respectively, which engage the lower surface of the grooved bar 20. By reason of the guiding pins 26, 27, 28, and 29, the jaws cannot be displaced from the grooved bars either by the action of the animal or through the movement communicated to the said jaws, due to the manipulation of the jaw operating elements.

In order to provide for the rapid movement of the jaws, means are supplied for operating the two jaws with relation to each other simultaneously by movement of a single element and to that end the upper ends of the jaws having links connected to them, the jaw 22 having a link 30 and the jaw 23 having a link 31 pivotally connected to it and these links are connected to a lever 32 on opposite sides of the pivot 33 on said lever, the said pivot extending through and being supported by a grooved bar 20. A toothed rack 34 is suspended from the bar 20 and is engaged by the detent 35 operated by the handle 36 carried by the lever so that the lever may be held in different positions of adjustment by reason of the engagement of the detent with one of the teeth of the rack and consequently the upper ends of the jaws may likewise be held in different positions of adjustment.

The lower end of the jaw 22 has a link 37 connected to it and the lower end of the jaw 23 has a link 38, the links 37 and 38 being connected to a lever 39 on opposite sides of its pivot 40. The lever 39 has a detent 41 which engages a toothed rack 42 which is constructed similar to that heretofore described and manipulation of the lever 39 will operate the lower ends of the jaws and they will be retained in different positions of adjustment through the detent and parts associated with it. It will be observed, therefore, that when the hog has his head projecting between the jaws, the said jaws may be speedily manipulated to clamp the same against the sides of the neck of the hog with such pressure as to effectually hold the said hog against movement while an operation is being performed.

When the device is to be used for loading and unloading hogs or other stock, the slotted bars are elevated to detach the suspending means thereof and thereafter an inclined platform or floor 43 is inserted in the casing or housing and rods 44 are supported between the sides thereof on which the platform or floor rests in the inclined position shown in Fig. 1.

I claim—

In a trap of the character described, a pen, a door for inclosing one end thereof, a clamp comprising the opposite end of the pen, said clamp including an upper and lower slotted bar, a hanger at each end of each bar, each of said hangers including a plate secured on the bar and extending across the slotted portion thereof, a bracket attached to the pen at each end of each bar for engaging the hangers of said bars, whereby the clamp is removably secured in the pen, clamping jaws having their ends projecting through the slots of the bars, retaining pins extending through the clamps transversely above the lower bar, retaining pins extending through the clamps transversely below the upper bar, a lever for the upper bar, a horizontally extending pivot for the lever, said pivot being supported by the bar, a lever for the lower bar, a pivot extending horizontally through the lower bar on which the lever is pivoted, a link above the top bar for connecting the lever and one of the jaws, a link below the upper bar connecting the upper lever and one of the jaws for communicating the motion of the upper lever to the jaw, a link below the lower bar connecting the lower lever with one of the jaws, a link above the lower bar connecting the lower lever and one of the jaws, and means for holding the levers in different positions of adjustment.

In testimony whereof, I affix my signature in the presence of two witnesses.

NORVAL B. GALLOWAY.

Witnesses:
LLOYD PAINTER,
E. E. BILLSBURY.